United States Patent [19]
Turk et al.

[11] Patent Number: 5,244,167
[45] Date of Patent: Sep. 14, 1993

[54] LIFT AUGMENTATION SYSTEM FOR AIRCRAFT

[76] Inventors: John Turk, 4656 Orchard St., San Diego, Calif. 92107; Kenneth W. Kinnan, 3030 Bunker Hill St., San Diego, Calif. 92109; Charles Kamanski, 63 Catspaw Cape, Coronado, Calif. 92118

[21] Appl. No.: 747,515

[22] Filed: Aug. 20, 1991

[51] Int. Cl.$^5$ ............................................. B64C 29/00
[52] U.S. Cl. ................................. 244/12.1; 244/12.4; 244/667; 244/23 B
[58] Field of Search ...................... 244/12.1, 12.3, 12.4, 244/66, 23 B, 56, 198, 204, 206, 209, 93

[56] References Cited

U.S. PATENT DOCUMENTS

| | | | |
|---|---|---|---|
| 1,766,844 | 6/1930 | Springer | 244/12.3 |
| 1,868,832 | 7/1932 | Henter et al. | 244/209 |
| 1,987,788 | 1/1935 | Morton | 244/56 |
| 2,415,710 | 2/1947 | Smith | 244/56 |
| 2,963,245 | 12/1960 | Bolton | 244/93 |
| 3,179,354 | 4/1965 | Alvaresz-Calderón | 244/12.4 |
| 3,260,477 | 7/1966 | Grahame | 244/12.3 |
| 3,284,027 | 11/1966 | Mesniere | 244/12.4 |
| 3,372,891 | 3/1968 | Malvestuto, Jr. | 244/201 |
| 4,828,203 | 5/1989 | Clifton et al. | 244/12.3 |

FOREIGN PATENT DOCUMENTS

| | | | |
|---|---|---|---|
| 278052 | 9/1930 | Italy | 244/56 |
| 610133 | 10/1960 | Italy | 244/12.4 |

Primary Examiner—Joseph F. Peters, Jr.
Assistant Examiner—Anne E. Bidwell

[57] ABSTRACT

A lift augmentation system for aircraft which comprises a plurality of propellers parallel to an aircraft wing and inset parallel to and at the trailing edge of the wing. The propellers function to both directly produce vertical lift in the manner of helicopter blades and to augment air circulation over the wing to enhance lift produced by the wing. The propellers are set into the trailing edge of the wing along the length of the wing, with the inboard propellers preferably closely spaced to the fuselage to force air flow over the reducing taper of the fuselage. Each propeller is tiltable in all directions about a vertical axis through the propeller hub and the assembly of engine and propeller is hinged to the wing for pivoting in a plane substantially parallel to the aircraft axis.

16 Claims, 2 Drawing Sheets

LIFT AUGMENTATION SYSTEM FOR AIRCRAFT

BACKGROUND OF THE INVENTION

This invention relates in general to aircraft lift augmentation systems and, more particular to a system using plural powered rotors parallel to the trailing edge of an aircraft wing.

Conventional aircraft generally have gas turbine engines or internal combustion engines either driving propellers or using direct thrust oriented substantially parallel to the wings, with the engines located in the nose of the fuselage or in or below the wings or adjacent to the aft of the fuselage. Because they must rely on the speed of the air over the wing surface to produce lift these aircraft tend to require long runways for landing and takeoff, especially when heavily loaded.

Helicopters use horizontally rotating airfoils to permit vertical takeoff and hovering. While having the ability to land and takeoff from very small areas, helicopters tend to have relatively low load carrying capacity.

A number of different aircraft have been designed in attempts to combine the load carrying capabilities of conventional aircraft and the vertical, or short distance, takeoff and landing abilities of helicopters. Among these are aircraft in which engines and propellers can be tilted between vertical and forward orientation, so that the aircraft can take off vertically or over a short distance with the propellers rotating in a substantially horizontal plane. The engines can then be rotated to bring the propellers into a conventional vertical plane during flight. Other similar aircraft tilt the entire wing carrying the engines and propellers between positions providing vertical and forward propulsion. While effective on a limited basis, these aircraft are often difficult to fly during the transition between vertical and horizontal flight, and tend to be heavy and have low payloads due to limitations in the vertical lift capabilities. These systems include engine on each side of the fuselage, each driving a large diameter propeller. A cross shaft must be provided between the engines to balance engine operation and allow one engine to drive both propellers in the event of failure of one engine. The cross shaft system is very heavy but necessary since, obviously, loss of thrust from one propeller would be catastrophic.

A system that combines conventional axial tractor engines and a horizontally rotating, helicopter-like, rotor inset into the center of the aft edge of a semi-circular aircraft wing above the fuselage is disclosed by Malvestuto in U.S. Pat. No. 3,372,891. This design has proven to be less than fully effective primarily due to the inefficient semi-circular wing, the single rotor, the lack of attitude control for the rotor and the above-fuselage location that distorts the pattern of downward rotor air flow.

Small aircraft, such as close support attack aircraft, have been provided with ducts directing jet engine flow in vertical or near vertical directions to provide vertical takeoff and landing capability, or short distance takeoff capability when heavily loaded. Again, aircraft control while transitioning between vertical and horizontal flight is difficult. The ducts and duct operating system tend to be heavy and complex, limiting the carrying and operational capacities of the aircraft and result in less than desired reliability.

A number of wing lift augmentation systems have been designed to increase wing lift at low speeds to permit short takeoff and landing capabilities. These include very large flaps, slots or leading edge extensions, various airflow deflector concepts and methods of blowing air over various wing surfaces. These systems depend on fine and precise control over jet sheets of air over the wing surfaces. This fine control is difficult to control under varying conditions in practice.

Thus, there is a continuing need for improvements in aircraft and aircraft propulsion lift systems to permit safe and reliable short takeoff and landing characteristics without significantly adversely affecting the operating characteristics of the aircraft or its load carrying capacity and which permits operation of the aircraft in a normal manner with the lift augmentation system disabled.

SUMMARY OF THE INVENTION

It is, therefore, an object of this invention to provide an aircraft lift augmentation system of reduced weight and improved reliability and simplicity. Another object is to provide an aircraft lift augmentation system that combines improved aircraft wing lift and direct horizontal and vertical air flow. A further object is to provide an aircraft lift augmentation system in which the direction of direct vertical air flow can be easily varied. Yet another object is to provide an aircraft lift augmentation system that is fail safe and permits aircraft operation in a normal manner with the lift augmentation system disabled.

The above-noted objects, and others, are accomplished by an aircraft lift augmentation system for a generally conventionally configured aircraft which comprises a plurality of propellers rotatable in a generally horizontal plane which are located parallel to and inset into the wing at the trailing edge.

The horizontal propellers are tiltable about their hubs in any desired direction and each entire propeller and drive assembly is tiltable in a vertical plane parallel to the aircraft axis to provide maximum operational flexibility and the ability to add a forward or aft propulsion component to the lift forces. The horizontal propellers preferably have uniform cross sections over their length. While any suitable propeller material may be used, wood or composite blades are preferred over metal for their increased flexibility and accommodation of varying loads.

The inboard propellers in each wing are preferably located close to the fuselage to induce lift and forward propulsion as air passes along the reducing taper of the fuselage sides and through the propeller. These inboard propellers may be tilted sideways outward at their hubs to increase this fuselage lift and propulsion, as desired.

We have found that the center of gravity of the aircraft changes with operation of the horizontal propellers. When the horizontal propellers are operated the center of gravity moves forward and, of course, aft if the horizontal propellers are turned off. The center of gravity location also varies with varying thrust from the horizontal propellers. While axially movable weights could be used to compensate for changes in center of gravity location, such weights are difficult to move and decrease the aircraft payload. Instead, we prefer to locate an auxiliary fuel tank as far aft in the fuselage as reasonably possible and to pump fuel between tanks in the forward part of the wing and the auxiliary tank to compensate for center of gravity changes. If the auxiliary tank is well aft, it need not be large because of the long moment arm. Fuel can be transferred as needed under manual or computer control.

Any suitable drive means may be used for the horizontal propellers. Preferably, the horizontal propellers are driven by power take-off from the main aircraft engines driving the tractor propellers (or jet engines, if desired). While a gear system could be used, we prefer individual conventional hydraulic motors powered by the main engines due to their small size and ease of directing hydraulic lines to the horizontal propeller motor housings. Of course, an individual motor could be used to drive each horizontal propeller, if desired, such as small electrical motors powered by a generator driven by the main engines or small internal combustion engines. These, however, tend to be much heavier and more complex than the preferred hydraulic motors.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
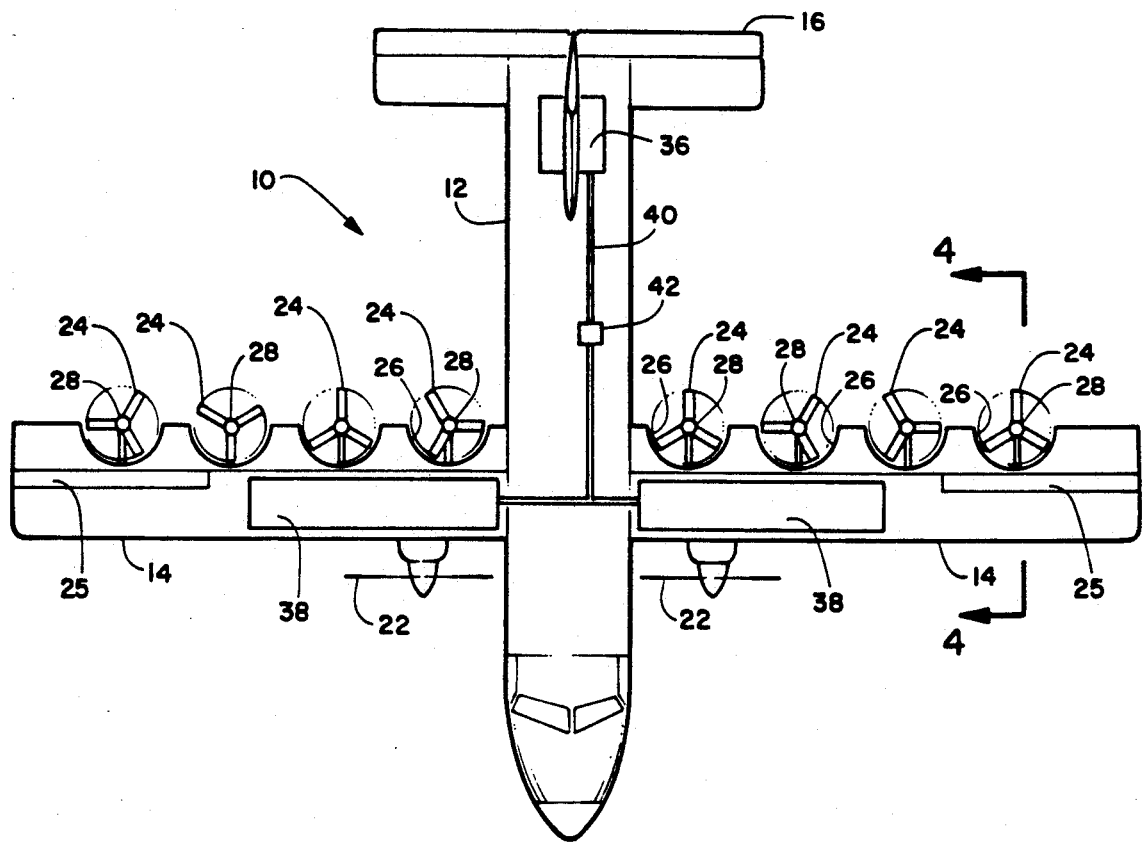
FIG. 1 is a schematic plan view of an aircraft incorporating the lift augmentation system of this invention.
Figure 2:
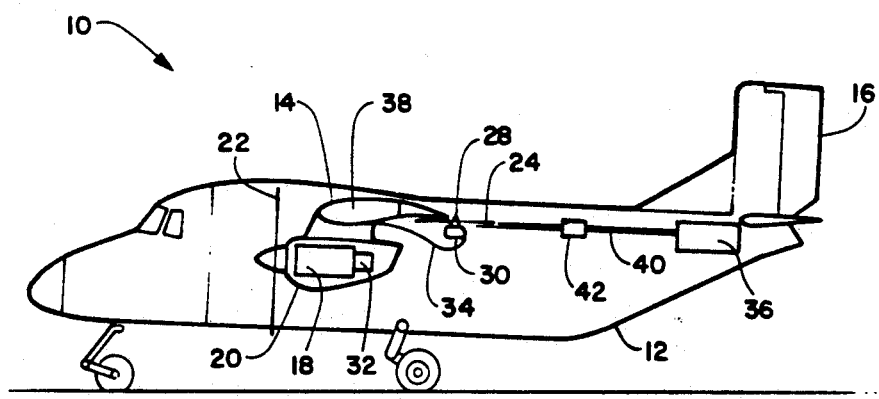
FIG. 2 is a schematic side elevation view of the aircraft of FIG. 1.

Referring now to FIGS. 1 and 2, there is seen an aircraft 10 of generally conventional configuration having a fuselage 12, wing 14 and empennage 16. Conventional flight engines 18 schematically indicated within housings 20 drive tractor propellers 22. Jet engines or any other engines producing aft-directed thrust may be used, if desired.

A plurality of horizontal propellers 24 are inset into cut-outs 26 in the aft edge of wing 14 in the form of portions of a circle. While the cut-outs 26 may have any suitable depth, we have found the best results are obtained with essentially semi-circular cutouts, with propeller hubs 28 lying along the trailing edge of wing 14. Propellers 24 are conventional variable reverse pitch propellers.

Propeller hubs 28 include a conventional gimbaling mechanism 29 of the sort used with helicopter hubs, permitting horizontal propellers 24 to be tilted somewhat in any direction. Each horizontal propeller 24 is preferably driven by a small, conventional, hydraulic motor 30 driven by hydraulic fluid flowing from conventional hydraulic pumps 32 driven by conventional power take-offs on engines 18. As discussed above, any other suitable drive means may be used, if desired. Hydraulic motors 30 are mounted in a housing 34 that is hingedly connected to wing 14, as detailed below.

The speed and resulting thrust and the pitch of horizontal propellers 24 may be varied depending upon flight or take-off requirements. For example, horizontal propellers 24 will typically be operated at maximum thrust during short distance take-off and landing operations and may be shut down or operated at reduced speed during flight, as desired. Increasing thrust of horizontal propellers 24 will move the aircraft center of gravity forward. In order to compensate for this center of gravity shift, we provide an auxiliary fuel tank schematically indicated at 36 as far aft in fuselage 12 as is reasonably possible. Conventional fuel tanks 38 are located in wing 14 or forward fuselage. Lines 40 connect aft tank 36 to wing tanks 38. A conventional fuel transfer pump 42 is provided to move fuel between the tanks under manual or conventional computer control to compensate for any center of gravity changes. In general, the aircraft will be designed to have a normal center of gravity with the horizontal propellers unpowered and the aft fuel tank empty. When horizontal propellers 24 are powered, an appropriate amount of fuel will be pumped from wing fuel tanks 38 to aft tanks 36 to compensate for the change in center of gravity.

Figure 3:
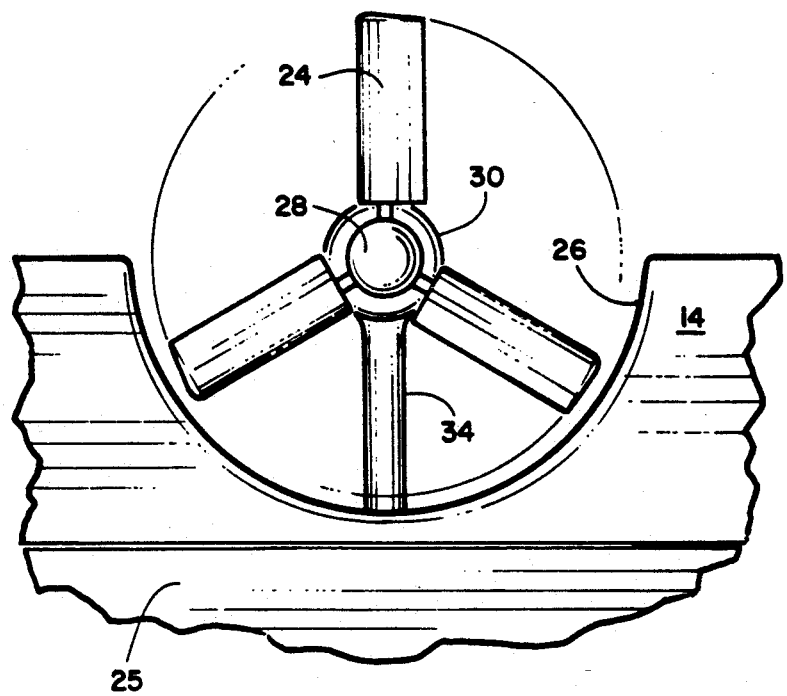
FIG. 3 is a detail plan view of one of the horizontal propellers.

As seen in FIG. 3, the blades of horizontal propeller 24 are preferably of uniform airfoil shape and cross section along their length, although the shape of the blades may be varied, if desired. The propeller may be rotated at any suitable speed. Generally, a speed up to about mach 0.8 is suitable, although under some circumstances a higher speed, up to mach 3-4 may be usable. In order to obtain maximum wing air flow augmentation into the vortex created by the propeller tip, the tips of the propeller blades should be closely spaced from the edge of cut-out 14.

Figure 4:
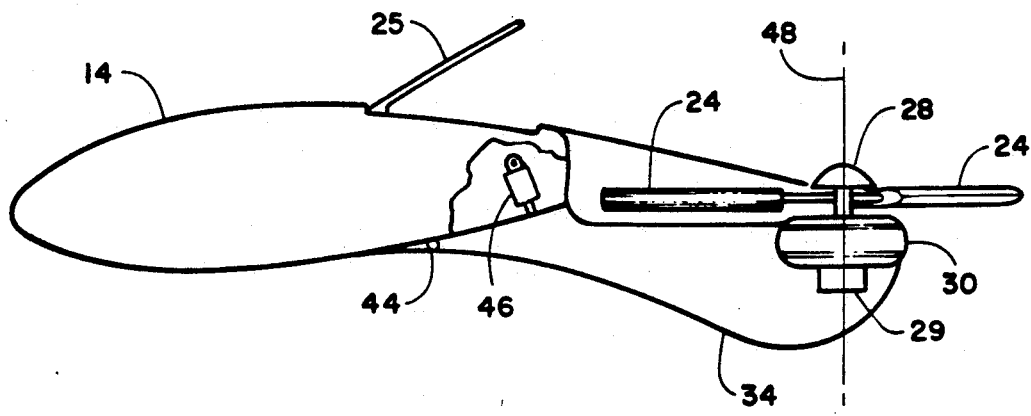
FIG. 4 is a section view taken on line 4—4 in FIG. 1.

As seen in section in FIG. 4, housing 34 that supports hydraulic motor 30 and propeller 24 is preferably hinged at 44 for vertical movement about that hinge in a plane generally parallel to the axis of the aircraft. Any suitable means, such as the hydraulic cylinder or screw jack schematically indicated at 46 can be used to support and tilt housing 34 as desired. In general, the housing is tilted to tilt the propeller axis a few degrees on either side of vertical line 48, as desired for optimum system operation or to generate a forward thrust vector in addition that which can be obtained by gimbaling the propeller at hub 28.

Figure 5:
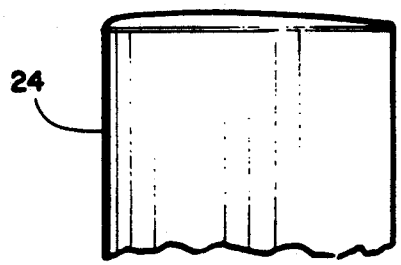
FIG. 5 is a detail plan view of the outer end of a horizontal propeller blade.

A detail view of the end of a preferred blade of propeller 24 is shown in FIG. 5. For optimum performance, the blade, may be curved to conform to the shape of cutout 26 (FIG. 3) if desired.

It should be noted that the horizontal propellers 24 are mounted at the wing edge which results in removal of the conventional aileron for maneuvering the aircraft. A spoiler 25, shown in drawing FIGS. 1 and 4, is added to replace the functions of the aileron.

Other applications, variations and ramifications of this invention will occur to those skilled in the art upon reading this disclosure. Those are intended to be included within the scope of this invention, as defined in the appended claims.

We claim:

1. A lift augmentation system for fixed wing aircraft which comprises:
    an aircraft comprising a fuselage, a lift producing main wing and at least one engine for producing flight thrust in an aft direction;
    a plurality of generally horizontal propellers set into generally partial circular cut-outs in the aft edge of said wing;
    each of said propellers having a drive means for rotating said propeller;
    each of said propellers and drive means mounted on a housing secured to said wing; and
    the hub of each propeller including means permitting each propeller to be selectively tilted in all directions.

2. The lift augmentation system according to claim 1 further including a large fuel tank in a forward portion of the aircraft, a smaller fuel tank at the aft end of said aircraft fuselage and means for moving fuel between said tanks to compensate for changes in aircraft center of gravity as said horizontal propellers are activated, changed in thrust or deactivated.

3. The lift augmentation system according to claim 1 wherein approximately half the circumference of each of said horizontal propellers is set into each of said wing cut-outs.

4. The lift augmentation system according to claim 1 wherein said drive means comprises a hydraulic motor in each of said housing for driving each propeller, a hydraulic pump powered by at least one flight engine and hydraulic lines connecting said hydraulic motors and pump to rotate said horizontal propellers.

5. The lift augmentation system according to claim 1 wherein said housing is secured to said wing by a hinge means allowing said housing and horizontal propeller to be tilted in a substantially vertical plane substantially parallel to the aircraft axis.

6. The lift augmentation system according to claim 1 wherein the blades of said horizontal propellers have substantially uniform cross sections along their lengths.

7. The lift augmentation system according to claim 1 wherein at least three horizontal propellers are provided in cut-outs in each of the right and left halves of said wing, with the inboard propellers closely spaced from the aircraft fuselage.

8. In a fixed wing aircraft having a fuselage, empennage, elongated lift producing wing and engines for producing thrust in a directly aft direction for moving said aircraft forward, the improvement comprising:
- at least one generally horizontal propeller set into a generally partially circular cut-out in the aft edge of each of the right and left half of said wing;
- drive means for rotating each of said horizontal propellers;
- housings secured to said wing and supporting each of said drive means and horizontal propellers; and
- means at each horizontal propeller hub for selectively tilting said horizontal propeller in any direction.

9. The improvement according to claim 8 further including a large fuel tank in the forward portion of said aircraft, a smaller fuel tank at the aft end of said aircraft fuselage and means for moving fuel between said tanks to compensate for changes in aircraft center of gravity as said horizontal propellers are activated, changed in thrust or deactivated.

10. The improvement according to claim 8 wherein about half the circumference of each of said horizontal propellers is set into each of said wing cut-outs with the propeller hub substantially aligned with the aft wing edge.

11. The improvement according to claim 8 wherein said drive means comprises a hydraulic motor mounted in each of said housings for driving each propeller, a hydraulic pump powered by at least one flight engine and hydraulic lines connecting said hydraulic motors and pump.

12. The improvement according to claim 8 wherein said housing is secured to said wing by a hinge means allowing said housing and horizontal propeller to be tilted in a substantially vertical plane substantially parallel to the aircraft axis.

13. The improvement according to claim 8 wherein the blades of said horizontal propellers have substantially uniform cross sections along their lengths.

14. The method of augmenting lift in an aircraft having an elongated lift producing wing, a fuselage and at least one flight engine producing thrust directly aft of said aircraft which comprises:
- forming at least one partially circular cut-out in the aft edge of each of the right and left halves of the wing;
- mounting a housing supporting a generally horizontal propeller and drive means on said wing with said horizontal propeller closely spaced to the edges of said cut-out;
- rotating said horizontal propellers to augment air flow over said wing and also provide direct vertical thrust; and
- tilting said propeller in any selected direction while said propellers are rotated.

15. The method according to claim 14 further including providing a large fuel tank in the forward portion of said aircraft, a small fuel tank in the aft fuselage and lines connecting said tank and pumping fuel between said tanks to compensate for changes in aircraft center of gravity when said horizontal propellers are activated, changed in thrust or deactivated.

16. The method according to claim 14 further including mounting said housing to said wing by a hinge allowing tilting said housing in a generally vertical plane substantially parallel to the aircraft axis and including the step of tilting said housing to change the vertical thrust angle of said horizontal propellers.

* * * * *